(12) United States Patent
Lai

(10) Patent No.: US 9,016,876 B2
(45) Date of Patent: Apr. 28, 2015

(54) LENS MODULE HAVING LIGHT-SHIELDING SPACER

(75) Inventor: Chien-Nan Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 919 days.

(21) Appl. No.: 13/187,540

(22) Filed: Jul. 21, 2011

(65) Prior Publication Data

US 2012/0314288 A1    Dec. 13, 2012

(30) Foreign Application Priority Data

Jun. 7, 2011    (TW) .............................. 100119812 A

(51) Int. Cl.
G02B 27/00    (2006.01)
G02B 13/00    (2006.01)

(52) U.S. Cl.
CPC .................................. G02B 13/0035 (2013.01)

(58) Field of Classification Search
None
See application file for complete search history.

(56) References Cited

U.S. PATENT DOCUMENTS

| 2004/0120046 A1 | 6/2004 | Shirie | |
| 2006/0291076 A1* | 12/2006 | Watanabe et al. | 359/811 |
| 2009/0185291 A1* | 7/2009 | Tsuchiya et al. | 359/738 |
| 2010/0027135 A1* | 2/2010 | Sodeyama et al. | 359/740 |

FOREIGN PATENT DOCUMENTS

TW    200823510 A    6/2008

* cited by examiner

*Primary Examiner* — Arnel C Lavarias
(74) *Attorney, Agent, or Firm* — Novak Druce Connolly Bove + Quigg LLP

(57) ABSTRACT

A lens module includes a first lens and a first spacer. The first lens includes a first optical portion and a first support portion surrounding the first optical portion. The first support portion includes a first upper surface facing an object side of the lens module and a first lower surface facing an image side of the lens module. The first lower surface includes a first annular portion, a slanted annular portion and an inner annular portion. The slanted annular portion is obliquely interconnected between the outer annular portion and the inner annular portion. The first annular portion and the inner annular portion are perpendicular to the optical axis of the lens module. The slanted annular portion faces inwardly of the first lens. The outer shield portion covers the first annular portion. The intermediate shield portion covers the slanted annular portion. The inner shield portion covers the inner annular portion.

9 Claims, 4 Drawing Sheets

LENS MODULE HAVING LIGHT-SHIELDING SPACER

BACKGROUND

1. Technical Field

The present disclosure relates to lens modules having spacers.

2. Description of Related Art

Generally, a lens module includes a lens barrel, a lens group and a spacer received in the lens barrel. The lens group may include one or more lenses. The spacer is attached to the lens to position the lens at a certain critical distance. When incident light strikes an optical surface of the lens group, parts of the incident light may be easily reflected by the optical surface and is finally received by an image sensor. Such reflected light may cause flare in images captured by the image sensor, that is, the optical performance of the lens module is not optimal.

Therefore, a lens module, which can overcome the limitations described, is needed.

DETAILED DESCRIPTION

Figure 1:
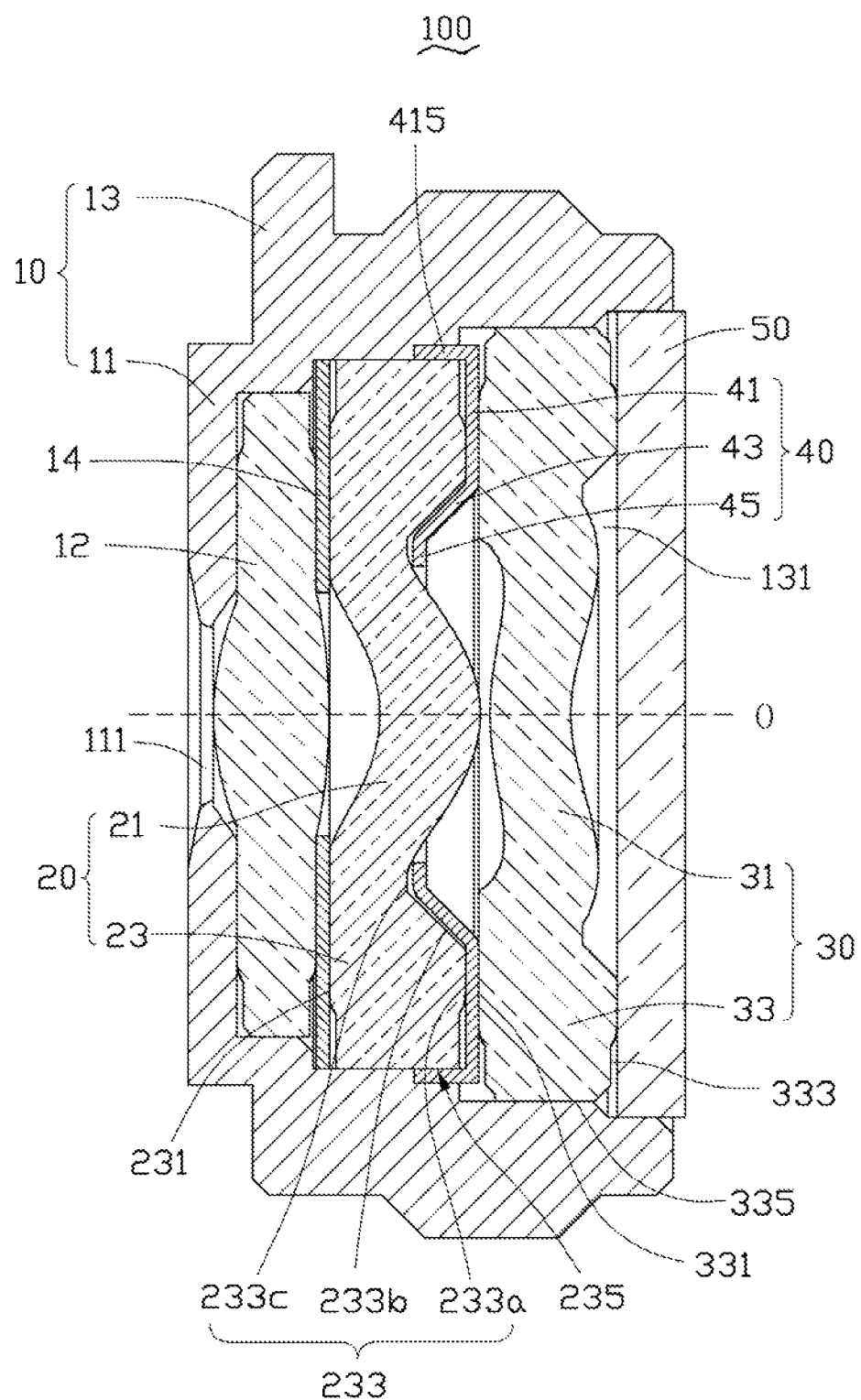
FIG. 1 is a sectional view of a lens module including a spacer, according to a first embodiment.

Referring to FIG. 1, a lens module 100, according to a first embodiment, includes a lens barrel 10, a first lens 20, a first spacer 40, a second lens 12, a second spacer 14, a third lens 30 and a filter 50. The second lens 12, the second spacer 14, the first lens 20, the first spacer 40, the third lens 30 and the filter 50 are arranged in the lens barrel 10 from an object side to an image side of the lens module 100.

The lens barrel 10 includes a front cover 11 and a cylinder 13 extending from the edges of the front cover 11. In this embodiment, the front cover 11 is substantially circular and the cylinder 13 extends perpendicular to the front cover 11. A light incident hole 111 is defined at a center of the front cover 11. The front cover 11 and the cylinder 13 cooperatively form a receiving space 131. The light incident hole 111 is in communication with the receiving space 131 and allows light to enter into the receiving space 131.

The second lens 12, the first lens 20 and the third lens 30 are made of plastic in this embodiment. The second lens 12 is in contact with the front cover 11 and the cylinder 13. The second spacer 14 is substantially plate-shaped and is sandwiched between the second lens 12 and the first lens 20.

The first lens 20 includes a first optical portion 21 and a first support portion 23 surrounding the first optical portion 21. The first support portion 23 includes a first upper surface 231, a first lower surface 233 and a first lateral surface 235 connecting the first upper surface 231 and the first lower surface 233. The first upper surface 231 faces the object side of the lens module 100 and is substantially parallel to the front cover 11. The first lower surface 233 faces the image side of the lens module 100 and extends inwardly to the object side of the lens module 100. The first lower surface 233 includes an outer annular portion 233a, a slanted annular portion 233b and an inner annular portion 233c. The outer annular portion 233a, the slanted annular portion 233b and the inner annular portion 233c are arranged in the order written towards an optical axis O of the lens module 100. The slanted annular portion 233b faces inwardly of the first lens 20. The slanted annular portion 233b is slanted with respect to the outer annular portion 233a and the inner annular portion 233c. The slanted annular portion 233b is obliquely interconnected between the outer annular portion 233a and the inner annular portion 233c. The first lateral surface 235 is in contact with the cylinder 13 and is substantially parallel to the optical axis O of the lens module 100. The outer annular portion 233a and the inner annular portion 233c are substantially perpendicular to the optical axis of the lens module 100.

The third lens 30 includes a second optical portion 31 and a second support portion 33 surrounding the second optical portion 31. The second support portion 33 includes a second upper surface 331, a second lower surface 333 and a second lateral surface 335 connecting the second upper surface 331 and the second lower surface 333. The second upper surface 331 faces the object side of the lens module 100 and is substantially parallel to the first upper surface 231. The second lower surface 333 faces the image side of the lens module 100 and extends inwardly to the object side of the lens module 100. The configurations of the second lower surface 333 are similar to those of the first lower surface 233. The second lateral surface 335 is in contact with the cylinder 13 and substantially parallel to the optical axis O of the lens module 100.

The first spacer 40 is sandwiched between the first lens 20 and the third lens 30 and is in contact with the first lower surface 233 and the second upper surface 331. The first spacer 40 has a shape substantially conforming to the first lower surface 233. The first spacer 40 includes an outer shield portion 41, an intermediate shield portion 43, and an inner shield portion 45 arranged in the order written towards the optical axis O of the lens module 100. The outer shield portion 41 is substantially an annular plate. The intermediate shield portion 43 is slanted with respect to the outer shield portion 41 and the inner shield portion 45. The intermediate shield portion 43 is obliquely interconnected between the outer shield portion 41 and the inner shield portion 45. The intermediate shield portion 43 faces inwardly of the first spacer 40. The intermediate shield portion 43 is frustoconical and is configured to block internal flare light from passing therethrough. The outer shield portion 41 and the inner shield portion 45 are concentric. The first spacer 40 is made of opaque elastic material, such as black polyester, or it may be comprised of metal coated with black paint. The metal may be copper, aluminum, iron, etc. The outer shield portion 41 and the inner shield portion 45 are substantially perpendicular to the optical axis O of the lens module 100. The intermediate shield portion 43 extends inward to the object side of the lens module 100.

Figure 2:
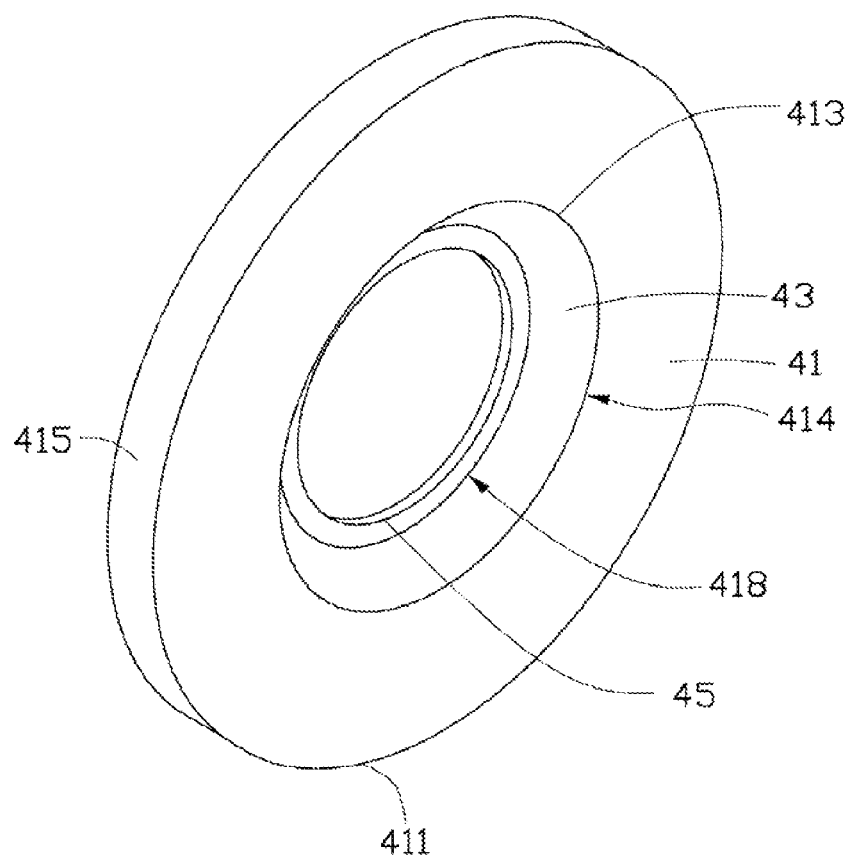
FIG. 2 is a schematic view of the spacer of FIG. 1.

Referring to FIG. 2, in detail, the outer shield portion 41 includes an outer periphery 411 and an inner periphery 413 and defines a first through hole 414 at a center of the outer shield portion 41. The center of the first through hole 414 coincides with the optical axis O of the lens module 100. A thickness of the outer shield portion 41 is about 0.030-0.054 millimeters. The outer shield portion 41 is attached to the outer annular portion 233a with adhesive or a similar method of attachment. A flange 415 extends from the outer periphery 411 towards the object side of the lens module 100. The flange 415 is substantially parallel to the optical axis O of the lens module 100. An inner diameter of the flange 415 is slightly greater than an outer diameter of the first lens 20. A height of the flange 415 is smaller than or equal to the width of the first lateral surface 235 along the optical axis O of the lens module 100. The first spacer 40 can be secured to the first lens 20.

The intermediate shield portion 43 extends from the inner periphery 413 of the outer shield portion 41 and is tapered from the inner periphery 413 of the outer shield portion 41. An included angle between the intermediate shield portion 43 and the outer shield portion 41 is greater than 0 degrees. In this embodiment, the included angle is approximately 65 degrees. The included angle between the intermediate shield portion 43 and the outer shield portion 41 is greater than that between the slanted annular portion 233b and the outer annular portion 233a. A second through hole 418 is defined at a center of the intermediate shield portion 43. The second through hole 418 and the first through hole 414 are concentric. A thickness of the intermediate shield portion 43 is about 0.030-0.054 millimeters. In this embodiment, in order to manufacture the outer shield portion 41 using an injection molding process, the thickness of the intermediate shield portion 43 is substantially the same as that of the outer shield portion 41. Glue or adhesive may be applied between the intermediate shield portion 43 and the slanted annular portion 233b to further secure the first spacer 40 to the first lens 20.

The inner shield portion 45 extends from a periphery of the intermediate shield portion 43 away from the outer shield portion 41. The inner shield portion 45 is substantially perpendicular to the optical axis O of the lens module 100.

The filter 50 is arranged at the image side of the third lens 30. In this embodiment, the filter 50 is attached to the second lower surface 333 using glue. The filter 50 may be an infrared-cut filter.

When in use, the first spacer 40 is engaged with the first lens 20. The flange 415 is in tight contact with the first lateral surface 235. Thus, the first spacer 40 can be secured to the first lens 20 in a desired position. The outer shield portion 41 covers the outer annular portion 233a, the intermediate shield portion 43 covers the slanted annular portion 233b and the inner shield portion 45 covers the inner annular portion 233c. When light from internal of the first lens 20 strikes the first lower surface 233, i.e., the outer annular portion 233a, the slanted annular portion 233b and the inner annular portion 233c of the first lens 20, the outer shield portion 41, the intermediate shield portion 43 and the inner shield portion 45 may block and/or absorb the light to prevent the light passing through the first spacer 40 and into the third lens 30. When external light from the first lens 20 propagates towards the outer annular portion 233a, the slanted annular portion 233b and the inner annular portion 233c of the first lens 20, the outer shield portion 41, the intermediate shield portion 43 and the inner shield portion 45 may block and/or absorb the light to prevent it striking the outer annular portion 233a, the slanted annular portion 233b and the inner annular portion 233c, and thus preventing the reflection of light from the outer annular portion 233a, the slanted annular portion 233b and the inner annular portion 233c. Therefore, any flare or other anomaly in images captured by an image sensor which were caused by reflected light can be eliminated or at least reduced to a minimum. That is, the optical performance of the lens module 100 is improved.

Figure 3:
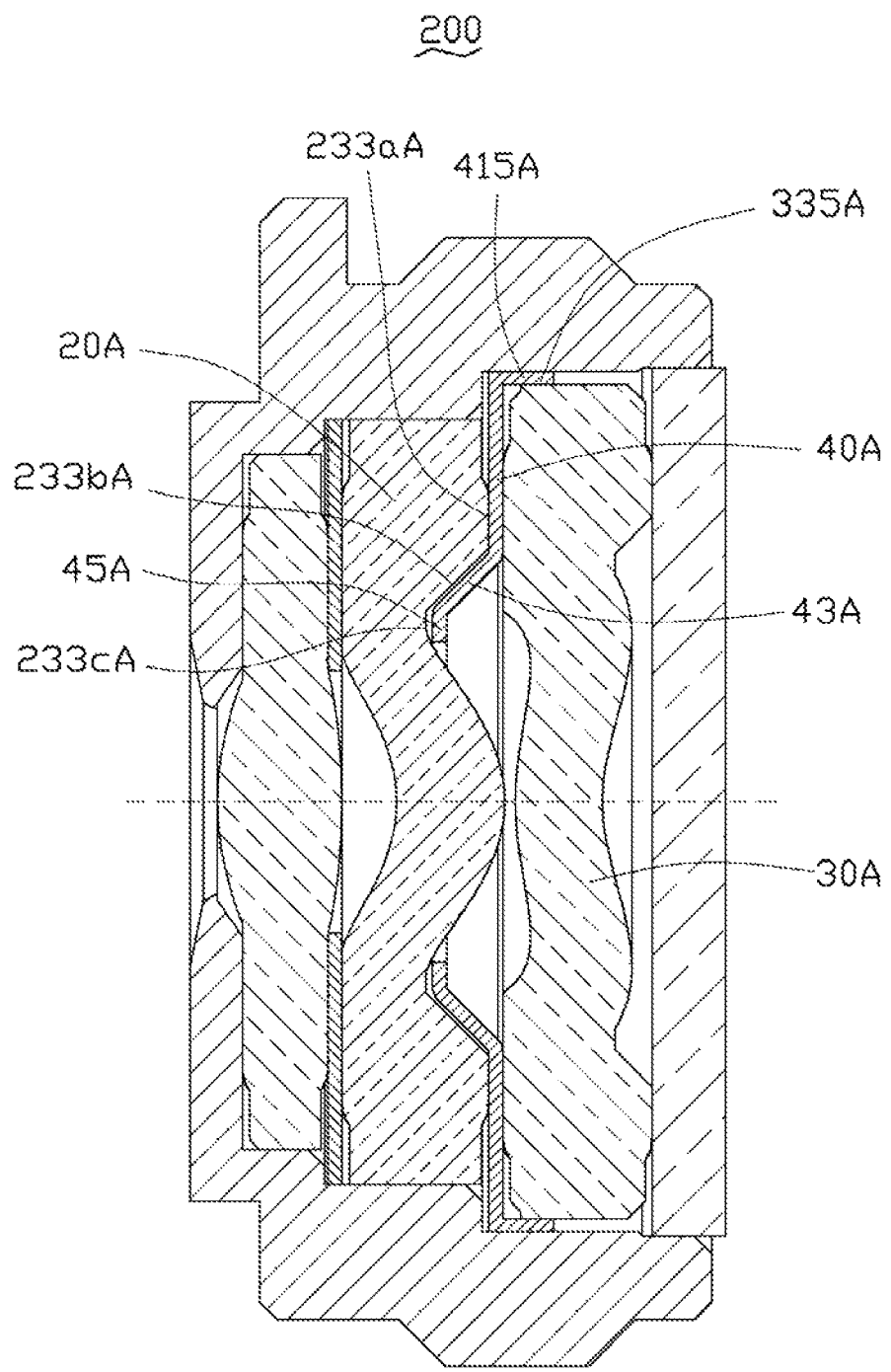
FIG. 3 is a sectional view of a lens module including a spacer, according to a second embodiment.
Figure 4:
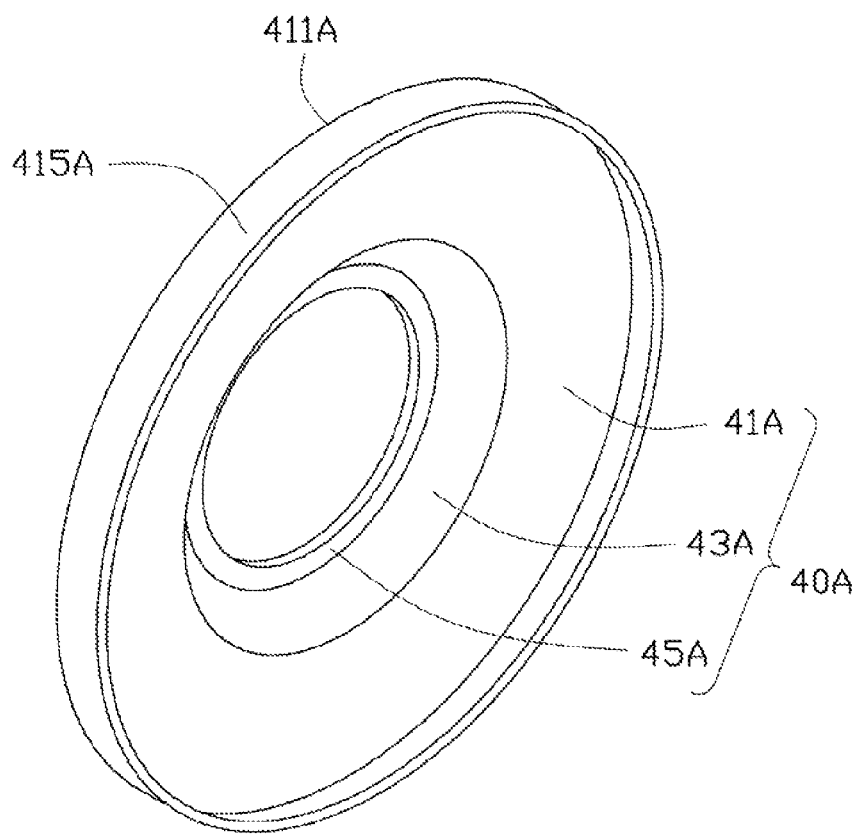
FIG. 4 is a schematic view of the spacer of FIG. 3.

Referring to FIGS. 3 and 4, a lens module 200, according to a second embodiment, is shown. The difference between the lens module 200 and the lens module 100 of the first embodiment is that a first spacer 40A is different.

A flange 415A of the first spacer 40A extends from an outer periphery 411A of an outer shield portion 41A towards the object side of the lens module 200. An inner diameter of the flange 415A is slightly larger than an outer diameter of the third lens 30A.

When in use, the third lens 30A is engaged with the first spacer 40A and a first lens 20A is attached to the first spacer 40A. The flange 415A is in very secure contact with a second lateral surface 335A of the third lens 30A. Thus, the first spacer 40A can be secured to the first lens 20A and the third lens 30A in a desired position. An outer shield portion 41A covers an outer annular portion 233aA, an intermediate shield portion 43A covers a slanted annular portion 233bA and an inner shield portion 45A covers an inner annular portion 233cA.

The advantages of the lens module 200 of this embodiment are the same as those of the lens module 100 of the first embodiment.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens module, comprising:
    a first lens arranged adjacent to an object side of the lens module, the first lens comprising a first optical portion and a first support portion surrounding the first optical portion, the first support portion comprising a first upper surface facing the object side, a first lower surface facing an image side of the lens module, and a first lateral surface connecting the first upper surface and the first lower surface, the first lateral surface being parallel to an optical axis of the lens module, the first lower surface comprising an outer annular portion, a slanted annular portion and an inner annular portion, the slanted annular portion obliquely interconnected between the outer annular portion and the inner annular portion, the outer annular portion and the inner annular portion being substantially perpendicular to the optical axis of the lens module, the slanted annular portion facing inwardly of the first lens;
    a first spacer arranged adjacent to the image side, the first spacer having a shape substantially conforming to the first lower surface, the first spacer comprising an outer shield portion, an intermediate shield portion, an inner shield portion, and a flange extending from a periphery of the outer shield portion towards the object side of the lens module, the flange being parallel to the optical axis of the lens module, the outer shield portion covering the outer annular portion, and the intermediate shield portion covering the slanted annular portion, the inner shield portion covering the inner annular portion, the intermediate shield portion obliquely interconnected between the outer shield portion and the inner shield portion; and
    a lens barrel defining a receiving space for receiving the first lens and the first spacer, wherein two opposite sides of the flange are in tight contact with the first lateral surface and the lens barrel.

2. The lens module of claim 1, wherein the first spacer is made of black polyester.

3. The lens module of claim 1, wherein the first spacer is comprised of metal coated with black paint.

4. The lens module of claim 1, wherein the first lower surface is attached to the first spacer with adhesive.

5. The lens module of claim 1, wherein the intermediate shield portion faces inwardly of the first spacer.

6. The lens module of claim 1, further comprising a second lens, a second spacer and a third lens, the second lens, the second spacer, the first lens, the first spacer and the third lens arranged in an order written from the object side to the image side of the lens module.

7. The lens module of claim 6, wherein the second spacer is substantially plate-shaped.

8. The lens module of claim 6, wherein the third lens comprises a second optical portion and a second support portion surrounding the second optical portion, the second support portion comprising a second upper surface facing the object side, a second lower surface facing the image side and a second lateral surface connecting the second upper surface and the second lower surface, the second upper surface in contact with the first spacer, the second lateral surface being substantially parallel to the optical axis of the lens module.

9. The lens module of claim 1, wherein an included angle between the intermediate shield portion and the outer shield portion is approximately 65 degrees.

* * * * *